Figure 1:
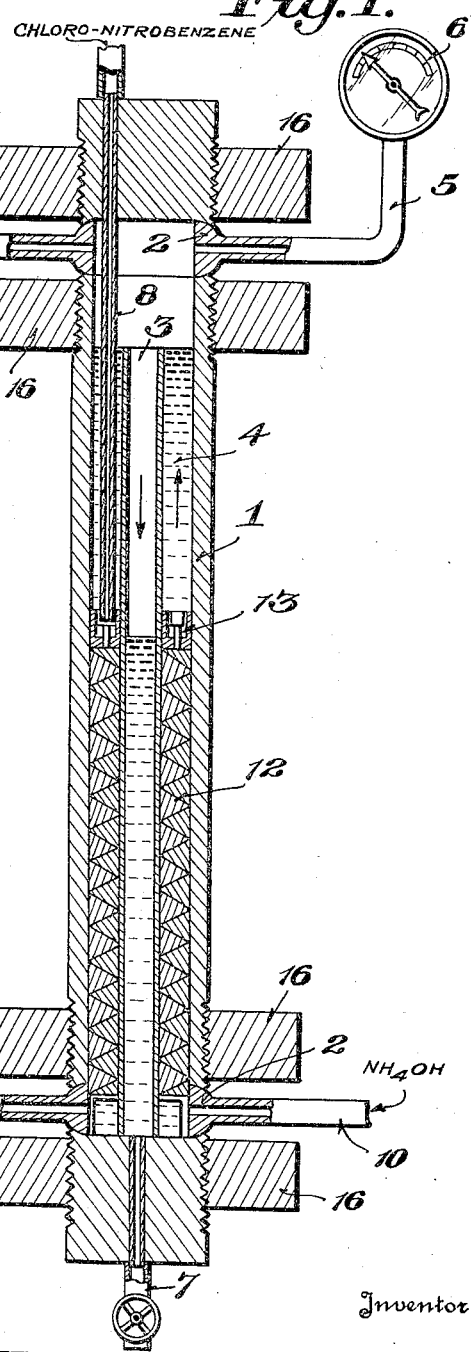

May 30, 1933.  K. H. SAUNDERS  1,911,717

MANUFACTURE OF NITROAMINOBENZENE

Filed July 14, 1930

Inventor

Kenneth H. Saunders,

By K. P. McElroy

Attorneys

Patented May 30, 1933

1,911,717

UNITED STATES PATENT OFFICE

KENNETH HERBERT SAUNDERS, OF BLACKLEY, MANCHESTER, ENGLAND, ASSIGNOR TO IMPERIAL CHEMICAL INDUSTRIES LIMITED, OF WESTMINSTER, ENGLAND

MANUFACTURE OF NITROAMINOBENZENE

Application filed July 14, 1930, Serial No. 467,973, and in Germany October 21, 1929.

This invention relates to the manufacture of nitroaminobenzenes; and it embraces a continuous process comprising establishing and maintaining a body of upwardly flowing ammonia liquor, distributing a flow of one or more halogenated nitrobenzenes within said body of ammonia liquor, supplying the flows of said ammonia liquor and said halogenated nitrobenzenes in predetermined molecular proportions, controlling the rates of said flows to cause the said halogenated nitrobenzenes to fall nearly to the bottom of said body of ammonia liquor before conversion to nitroaminobenzenes, and recovering the resulting dissolved nitroaminobenzenes from an upper point of said body of ammonia liquor, the whole process being conducted under conditions of heat and pressure; all as more fully hereinafter set forth and as claimed.

In my prior and copending applications, Ser. Nos. 315,906 (now matured into U. S. Patent No. 1,877,145) and 364,153 (now matured into U. S. Patent No. 1,884,880), of which the present application is a continuation in part, I have described two types of apparatus suitable for carrying out continuous chemical reactions under conditions of heat and pressure. In a specific example of the operation of the apparatus of these copending applications, I describe a process for the manufacture of para-nitraniline from para-chloro-nitrobenzene. In my copending applications I have claimed the apparatus itself, while the present application is drawn to a process of preparing nitroaminobenzenes in general from halogenated nitrobenzenes.

Prior processes for the production of nitroaminobenzenes from halogenated nitrobenzenes have consisted in heating the constituents in a closed vessel or in a coiled pipe through which ammonia liquor is circulated in contact with a body of halogenated nitrobenzene. The continuous type of process is greatly to be preferred, but in carrying out such reactions under heat and pressure the use of a hydraulic accumulator is generally required as a means of keeping a steady working pressure. Such equipment is expensive and likely to fail because of corrosion. The use of coils for heating, while satisfactory in experimental work, is not convenient for operation on a large scale. Coils are undesirable in all pressure reactions in which corrosion is likely to occur because of the impossibility of inspection. And even though periodically replaced there is always an element of danger in their use.

In my acknowledged copending applications I have described two types of reaction vessels suitable for use in the manufacture of nitroaminobenzenes and eliminating the above mentioned difficulties and dangers of the prior art. My new process, while independent of the specific apparatus employed, can be conveniently carried out by using my reaction vessels and will be described in connection therewith.

In the accompanying illustrations I have shown, more or less diagrammatically, the reaction vessels of my copending applications. In this showing Fig. 1 is a vertical section of a reaction vessel with certain parts in elevation, while Fig. 2 is a similar vertical section of a modified and improved form of reaction vessel.

Referring to the figures, wherein like numerals refer to like structures, element 1 designates the body of the reaction vessel which is advantageously a vertical steel or iron cylinder suitable for retaining high pressures. This can be closed at both ends by lens ring joints 2. These joints may be clamped together by annularly placed bolts 15 which pass through the threaded collars or flanges 16. Various tubes, such as 10 and 11, leading into the reaction vessel, may be attached at the lens joints. To an upper one of these, 5, there is, as shown, an attached pressure gage 6. A vertically disposed central tube, open at the top, is shown at 3. At the bottom of this central tube and in communication therewith, there is attached a tube 7. The central tube leaves an annular space 4, between the walls of the reaction vessel. The lower section of this annular space may be filled with packing or Raschig rings 12, surmounted by a distributor plate 13, into which may dip a tube 8.

A pyrometer may be inserted, as shown, at 9.

Figure 2:
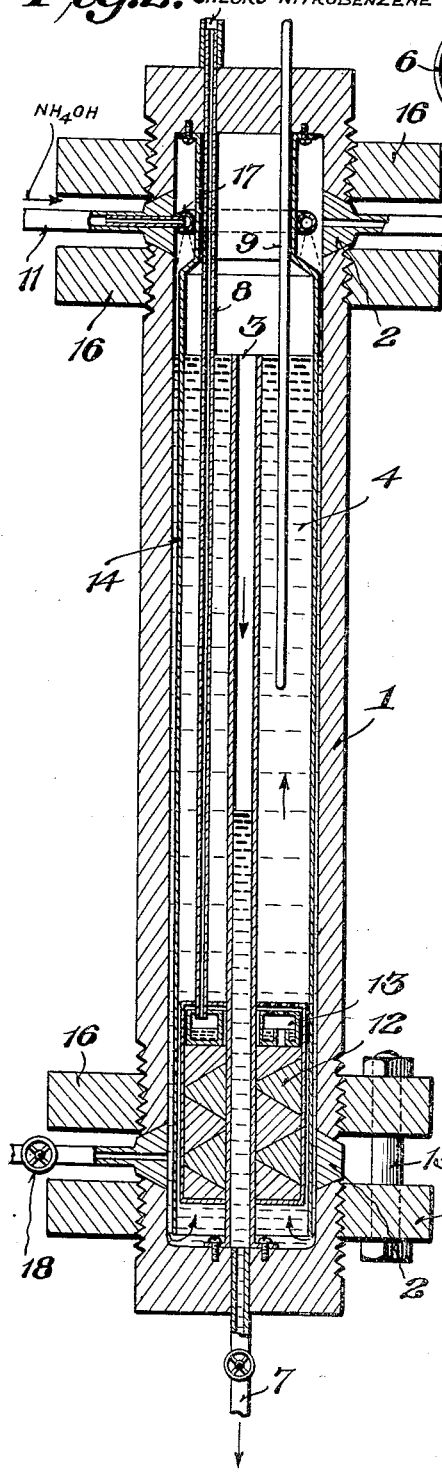

The apparatus of Fig. 2 differs from that of Fig. 1 by having a mantle 14, supported from the top of the reaction vessel, the said mantle reaching nearly to the bottom and leaving only a small space between itself and the wall of the reaction vessel. The apparatus of Fig. 2 has in addition a distributor ring 17 in connection with the side tube 11.

For use in the manufacture of nitroaminobenzenes, the mantle 14 and central tube 3 are advantageously of "stainless steel" (a chromium-iron alloy) or other noncorrosive metal. I have found it advantageous to protect these parts of the vessel from corrosion caused by the reaction products of the halogenated nitrobenzenes and the ammonia. This corrosion may be due to the presence of the ammonium halide which is formed in the process, although it could be expected that the excess of ammonia used would inhibit such action.

In using the reaction vessel of Fig. 1, for the process of my present invention, I introduce preheated ammonia liquor, of approximately 0.88 specific gravity, into the bottom of the vessel through the tube 10, under pressure.

The halogenated nitrobenzol is also preheated and forced through the tube 8 leading to the distributor plate 13. This liquid is considerably heavier than the ammonia liquor and falls downward through the packing below the distributor plate, becoming thoroughly dispersed and mixed with the ammonia liquor. Conversion to nitroaminobenzene occurs some time before the nitrobenzol reaches the bottom of the container and this product, being soluble in the ammonia liquor, dissolves and flows upward with the flow of liquor. The reaction products overflow into the central tube and are drawn off at the bottom through the tube 7. The vapor space above the reaction products serves the purpose of balancing the pressure and hence no hydraulic accumulator is required.

In the apparatus of Fig. 2 the process is similar. In this case the preheated ammonia liquor is forced into the vessel through the tube 11 and is distributed outside the mantle 14 by the ring 17. The ammonia liquor flows down to the bottom of the reaction vessel outside the mantle and then upwards inside the annulus between the mantle and the central tube. As the liquor passes upwardly through the packing 12 it meets a countercurrent flow of the halogenated nitrobenzene, supplied by the distributor plate 13. The reaction products overflow into the central tube and are removed at the bottom in a similar manner to the operation of the apparatus of Fig. 1.

The reaction vessels may be heated in any suitable manner, externally or internally. The reacting liquids are maintained at temperatures approximating 200–250° C. or the vessels may be heated until the pressure rises to from 80 to 100 atmospheres. These temperatures and pressures may be varied to suit the conditions of the process, depending on the particular halogenated nitrobenzol employed. The values given correspond to those which have been found advantageous in using ortho or para chloronitrobenzenes.

When using these chloronitrobenzenes I introduce from 150 to 200 grams of molten chloronitrobenzene, heated to approximately 225° C., through the tube 8, to every liter of 0.88 ammonia liquor forced in through the tubes 10 or 11. This provides a considerable excess of ammonia over the molecular proportions required. The reaction with the ammonia liquor, which is also heated to about the same temperature, is rapid and the complete reaction to form the nitroaminobenzene can take place in the period of time necessary for a given particle in the ammonia stream to travel upwards from the distributor plate and overflow into the central tube. I usually employ a rate of flow of the reacting liquids such that a period of contact of 30 to 40 minutes is allowed for the reaction to take place.

When using the apparatus of Fig. 2, it is desirable to regulate the flows of halogenated nitrobenzol and ammonia liquor and also the depth of packing 12, in order that the unconverted halogenated nitrobenzol shall not quite reach the bottom of the container. In this case the corrosive solution is at all times contained between the walls of stainless steel or other non-corrosive material.

The reaction vessels shown in Figs. 1 and 2 are easily dismantled and examined for signs of corrosion. The valves 18 are only used in cases of emergency to blow down the contents of the vessels. It is convenient to have a device to indicate the height of the liquor in the tube 3, so that the rate of withdrawal of reaction products can be governed accordingly.

The above specific examples are given for purposes of illustrating my invention and are not to be considered as limiting its scope. Other halogenated nitrobenzenes can be converted into the corresponding nitroaminobenzenes with but slight changes in the operating conditions. Mono- or poly-amino bodies may be formed and either chlorine or bromine compounds may be employed.

What I claim is:—

1. In the manufacture of nitroaminobenzenes, the process which comprises establishing and maintaining contacting countercurrent flows of ammonia liquor and halogenated nitrobenzene.

2. In the manufacture of nitroaminobenzenes, the process which comprises establishing and maintaining contacting countercurrent flows of ammonia liquor and halogenated nitrobenzene, the said flows of halogenated nitrobenzene and ammonia liquor being controlled so that the ammonia is in excess.

3. In the manufacture of nitroaminobenzenes, the process which comprises establishing and maintaining countercurrent flows of ammonia liquor and halogenated nitrobenzene, the said flow of halogenated nitrobenzene being dispersed in the said ammonia liquor.

4. The method of manufacturing nitroaminobenzenes continuously by a reaction in liquid phase under substantially uniform superatmospheric vapor pressure consisting in continuously introducing a halogenated nitrobenzene and ammonia into a reaction zone in liquid phase whence on completion of the reaction the liquid continuously overflows into an outlet and is drawn off.

5. The process of continuously producing nitroaminobenzenes by a reaction in liquid phase under substantially uniform superatmospheric pressure which comprises continuously introducing ammonia and a halogenated nitrobenzene into a reaction zone in liquid phase, maintaining a body of gases positioned above and in contact with said liquid mixture to control the pressure under which reaction is effected, and continuously removing reaction products thus formed from the liquid reaction mixture.

6. The process of continuously manufacturing nitroaminobenzenes by reaction in liquid phase under substantially uniform superatmospheric vapor pressure which comprises forming a vertical column of a liquid mixture from ammonia and a halogenated nitrobenzene, maintaining said liquid reaction mixture at reaction temperature, forming and maintaining a body of gases positioned above and in contact with said liquid mixture to control the pressure under which reaction is effected, continuously introducing ammonia and the halogenated nitrobenzene in the lower part of said vertical column, and causing the reaction products to overflow into an outlet disposed at the top of said column.

7. The process of continuously producing nitroaminobenzenes by a reaction in liquid phase under substantially uniform superatmospheric pressure which comprises establishing and maintaining a body of upwardly flowing ammonia liquor, distributing a flow of a chloronitrobenzene at an intermediate point in said body of ammonia liquor, maintaining the liquid reaction mixture at reaction temperature, keeping a body of gases positioned above and in contact with said liquid mixture to control the pressure under which reaction is effected, and continuously removing reaction productes from an upper point of the liquid column.

8. The process of continuously producing p-nitraniline by a reaction in liquid phase under substantially uniform superatmospheric pressure which comprises establishing and maintaining a body of upwardly flowing ammonia liquor, distributing a flow of p-chloronitrobenzene at an intermediate point in said body of ammonia liquor, maintaining the liquid mixture at reaction temperature, keeping a body of gases positioned above and in contact with said liquid mixture to control the pressure under which reaction is effected, and continuously removing reaction products from an upper point of the liquid column.

In testimony whereof, I have hereunto affixed my signature.

KENNETH HERBERT SAUNDERS.